United States Patent [19]
Dorenbosch et al.

[11] Patent Number: 5,864,570
[45] Date of Patent: Jan. 26, 1999

[54] METHOD AND APPARATUS FOR COMMUNICATING SELECTED ADDITIONAL DATA IN A DATA STREAM OF FIXED SIZE

[75] Inventors: Jheroen Pieter Dorenbosch, Paradise; Jyh-Han Lin, Keller; Alain Charles Louis Briancon, McKinney, all of Tex.

[73] Assignee: Motorola, Inc., Schaumburg, Ill.

[21] Appl. No.: 824,388

[22] Filed: Mar. 26, 1997

[51] Int. Cl.⁶ .............................. G06F 11/00; H04B 17/00
[52] U.S. Cl. ........................................... 371/5.1; 455/67.3
[58] Field of Search ........................... 371/5.1, 2.1, 20.1, 371/68.2, 67.1; 395/185.01, 185.02; 364/265.1; 370/241, 242, 245, 252; 340/825.36, 825.4, 825.44; 455/67.1, 67.3, 423, 426

[56] References Cited

U.S. PATENT DOCUMENTS

| | | | |
|---|---|---|---|
| 5,384,565 | 1/1995 | Cannon | 340/825.44 |
| 5,396,660 | 3/1995 | Cannon | 455/343 |
| 5,463,382 | 10/1995 | Nikas et al. | 340/825.44 |
| 5,473,612 | 12/1995 | Dehner, Jr. et al. | 370/514 |
| 5,526,401 | 6/1996 | Roach, Jr. et al. | 455/426 |

Primary Examiner—Trinh L. Tu
Attorney, Agent, or Firm—R. Louis Breeden

[57] ABSTRACT

A method and apparatus utilize an original stream (424) for communicating. Additional data is selected from predetermined messages to define a selected message (422). The original stream is altered (604) in a manner corresponding uniquely with the selected message to form a transmission stream (522) having a size identical to that of the original stream, and the transmission stream is then communicated (606, 608). The alteration of the stream is reversed (612) as it applies to the predetermined messages, thereby generating candidate streams. An error tally (544) corresponding to each of the candidate streams is determined (614) from an error checking mechanism (310, 312). From the candidate streams a member is selected corresponding to a lowest error tally, the member thereafter defined (620) to be a restored original stream. One of the predetermined messages is selected (622) as the selected message associated with the lowest error tally.

21 Claims, 5 Drawing Sheets

METHOD AND APPARATUS FOR COMMUNICATING SELECTED ADDITIONAL DATA IN A DATA STREAM OF FIXED SIZE

FIELD OF THE INVENTION

This invention relates in general to communication systems, and more specifically to a method and apparatus in a data communication system for communicating selected additional data without increasing the size of a data stream.

BACKGROUND OF THE INVENTION

In a radio communication system, spectrum is often reused in geographically distinct, but nearby, regions. In the case of two-way messaging systems, for example, inbound frequencies used by portable messaging units to transmit to the fixed equipment may be reused in nearby or even overlapping zones. Under certain reception conditions co-channel signals can travel further than normal and can be received in reuse zones for which the signals are not intended. In addition, transmitter spurious emissions may sometimes cause unintended "ghost" transmissions on nearby channels. These ghost transmissions will appear as low energy copies, often with sufficient signal strength to be decoded as error free signals.

Either of the two above described conditions can produce signals in one region which are not intended for that region. In prior art systems, such signals have caused some degree of confusion, and at the very least have resulted in unnecessary processing to distinguish the traffic intended for the region from that intended for another. A trivial solution to this problem would be to add bits to the transmission data streams used by the portable messaging units for encoding a destination field in each transmission. The overhead of transmitting such an additional field, however, is undesirable. Moreover, for the case of a protocol that is already in wide use, adding a new field is not feasible if unused bits are not available in the defined data streams for adding the field to the protocol.

Thus, what is needed is a method and apparatus that can distinguish a signal intended for a region from a signal intended for another region. The method and apparatus will preferably not require an additional field to be added to the data stream. More broadly, what is needed is a method and apparatus in a data communication system for communicating selected additional data without increasing the size of the data stream.

SUMMARY OF THE INVENTION

An aspect of the present invention is a method in a communication system utilizing an original data stream for communicating information by using a communication protocol having an error checking mechanism. The method is for communicating additional data selected from at least two predetermined messages to define a selected message, wherein the at least two predetermined messages represent regional identifiers. The method comprises the steps of altering the original data stream in a manner corresponding uniquely with the selected message to form a transmission data stream having a size identical to that of the original data stream, and communicating the transmission data stream. The method further comprises the steps of selecting a trial message from the at least two predetermined messages, and reversing the altering step as if the altering step had been performed in accordance with the trial message, thereby generating a candidate data stream. The method also includes the steps of determining from the error checking mechanism an error tally corresponding to the candidate data stream, and continuing the selecting, reversing, and determining steps until finding a lowest error tally. In addition, the method includes the step of estimating the selected message to be the trial message corresponding to the lowest error tally.

Another aspect of the present invention is a communicator in a communication system utilizing an original data stream for communicating information by using a communication protocol having an error checking mechanism. The communicator is for communicating additional data selected from at least two predetermined messages to define a selected message, wherein the at least two predetermined messages represent regional identifiers. The communicator comprises a memory for storing the selected message and further for storing the original data stream; and a processor coupled to the memory, the processor programmed to alter the original data stream in a manner corresponding uniquely with the selected message to form a transmission data stream having a size identical to that of the original data stream. The communicator further comprises a transmitter coupled to the processor for communicating the transmission data stream to a receiver, and a user interface for conveying the information to a user.

Another aspect of the present invention is a base station in a communication system utilizing an original data stream for communicating information by using a communication protocol having an error checking mechanism. The base station is for receiving additional data selected from at least two predetermined messages to define a selected message, wherein the at least two predetermined messages represent regional identifiers. The base station comprises a receiver for receiving a transmission data stream comprising the additional data from a communicator of the communication system, the transmission data stream formed by the communicator by altering the original data stream in a manner corresponding uniquely with the selected message, and a memory coupled to the receiver for storing the transmission data stream. The base station further comprises a processor coupled to the receiver for processing the transmission data stream. The processor is programmed to select a trial message from the at least two predetermined messages, and to reverse the altering of the original data stream as if the altering had been performed in accordance with the trial message, thereby generating a candidate data stream. The processor is further programmed to determine from the error checking mechanism an error tally corresponding to the candidate data stream; and to continue to select a trial message, reverse the altering, and determine a corresponding error tally until finding a lowest error tally. The processor is also programmed to estimate the selected message to be the trial message corresponding to the lowest error tally.

DETAILED DESCRIPTION OF THE DRAWINGS

Figure 1:
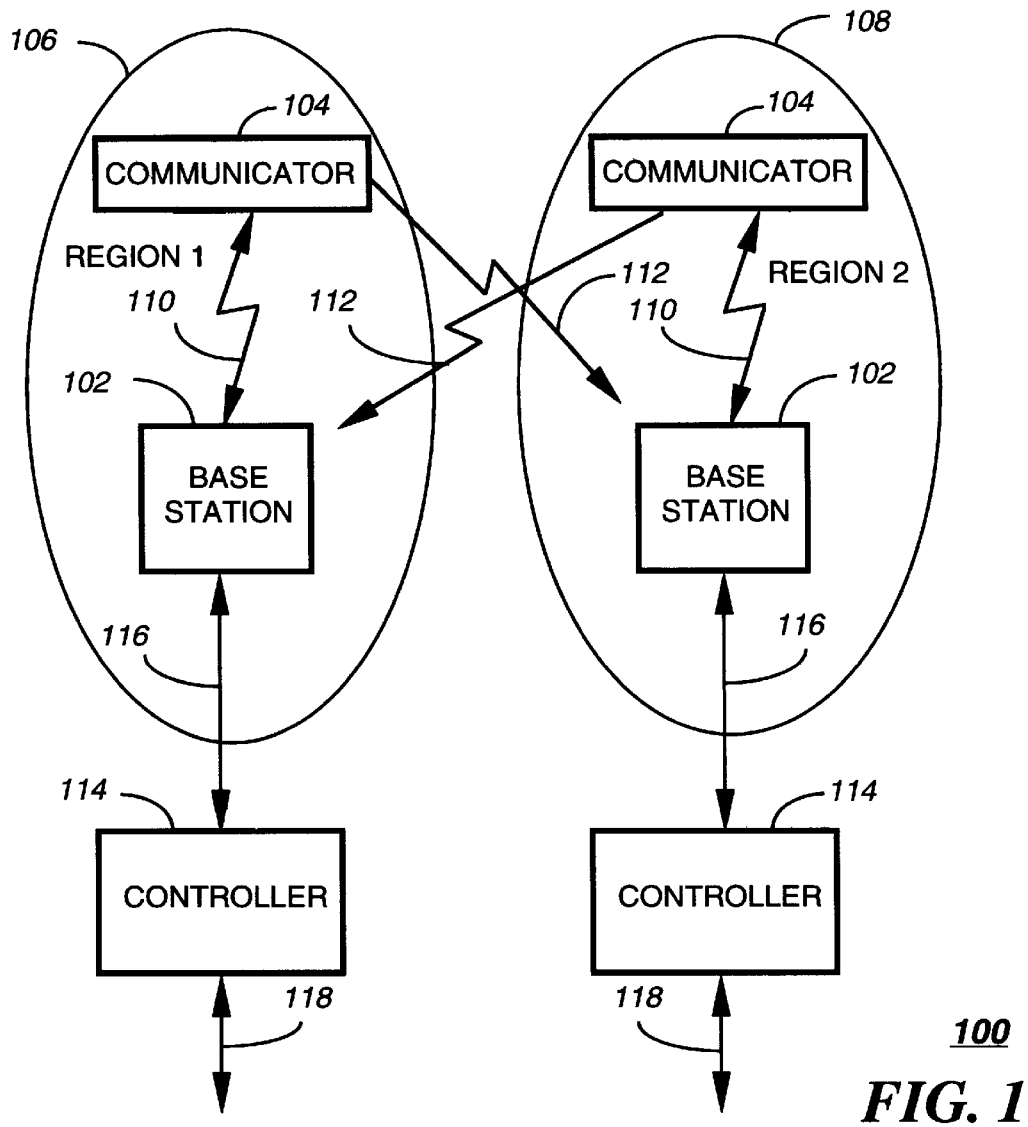
FIG. 1 is an electrical block diagram of a communication system in accordance with the present invention.

Referring to FIG. 1, an electrical block diagram depicts a communication system 100 in accordance with the present invention. The communication system 100 comprises at least two base stations 102, the base stations 102 providing radio coverage in first and second non-overlapping regions 106, 108. The base stations 102 are coupled by desirable radio paths 110 to communicators 104. The communicators 104 are preferably two-way messaging units, which can generate inbound responses to the base stations 102. Due to radio propagation characteristics, through undesirable radio paths 112, the inbound responses of communicators 104 positioned in the first and second regions, respectively, sometimes can reach base stations 102 that are positioned in the second and first regions 108, 106, respectively. Such "foreign" inbound response signals can be on the same frequency as originally transmitted, or on "ghost" frequencies generated spuriously, and have caused additional traffic processing loads and possibly some confusion in prior art systems, as discussed above in the Background of the Invention.

The base stations 102 are coupled by communication links 116 to conventional controllers 114 for controlling the base stations 102 using techniques well known in the art. The controllers 114 are coupled through additional communication links 118 to an input entity (not shown) for generating message originations using well-known techniques. The input entity can be, for example, a telephone set, a video display terminal, another controller, or a network interconnecting any or all of the above input entities.

The signals over the radio paths 110, 112 preferably utilize a well-known messaging protocol, such as Motorola's FLEX™ family of protocols. These protocols comprise error detection and correction mechanisms, which give the protocols the necessary robustness for use in radio communication systems.

Figure 2:
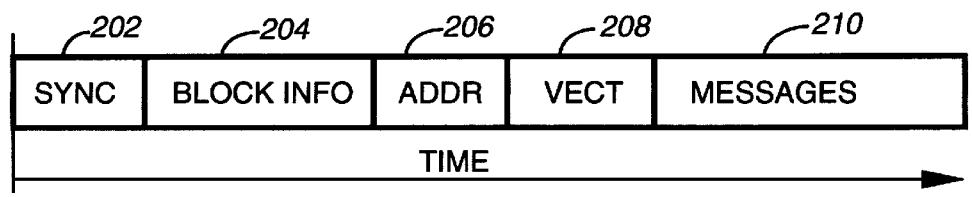
FIG. 2 is a diagram of an outbound data block in accordance with the present invention.

Referring to FIG. 2, a diagram depicts an outbound (base station to communicator) data block 200 in accordance with the present invention. The data block 200 comprises a sync portion 202 for use in synchronizing the communicators 104 with transmissions of the base stations 102 using techniques well known in the art. The data block 200 further comprises a block information word 204, which provides system configuration information to the communicators 104. The data block 200 also includes selective call addresses 206 of selected communicators 104 for which the remainder of the data block is intended. The addresses 206 point to vectors 208, which in turn point to messages 210, using well known techniques.

Figure 3:
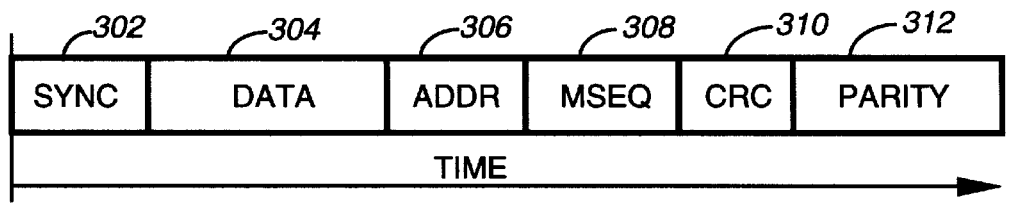
FIG. 3 is a diagram of an inbound data stream in accordance with the present invention.

Referring to FIG. 3, a diagram depicts an inbound data stream 300 in accordance with the present invention. The inbound data stream 300 preferably consists of a single data packet. The inbound data stream 300 comprises a sync field 302 for use in synchronizing receivers 508 (FIG. 5) of the base stations 102 with transmissions of the communicators 104 using techniques well known in the art. The data stream 300 further comprises a data field 304 for conveying information to the base stations 102, and an address field 306 for providing the address of the communicator 104 sending the information. The data stream 300 also includes a message sequence field 308 for helping keep track of the order of the messages, using well-known techniques. In addition, the data stream includes an error checking mechanism comprising a cyclic redundancy check (CRC) field 310 and a parity field 312. The error checking mechanism 310, 312 operates in a well-known manner to detect and correct transmission errors provided the errors are not too numerous in any one data stream 300. It will be appreciated that, alternatively, the inbound data stream 300 can include a plurality of data packets. It will be further appreciated that, if desired, the present invention can be applied to an outbound data stream as well.

Figure 4:
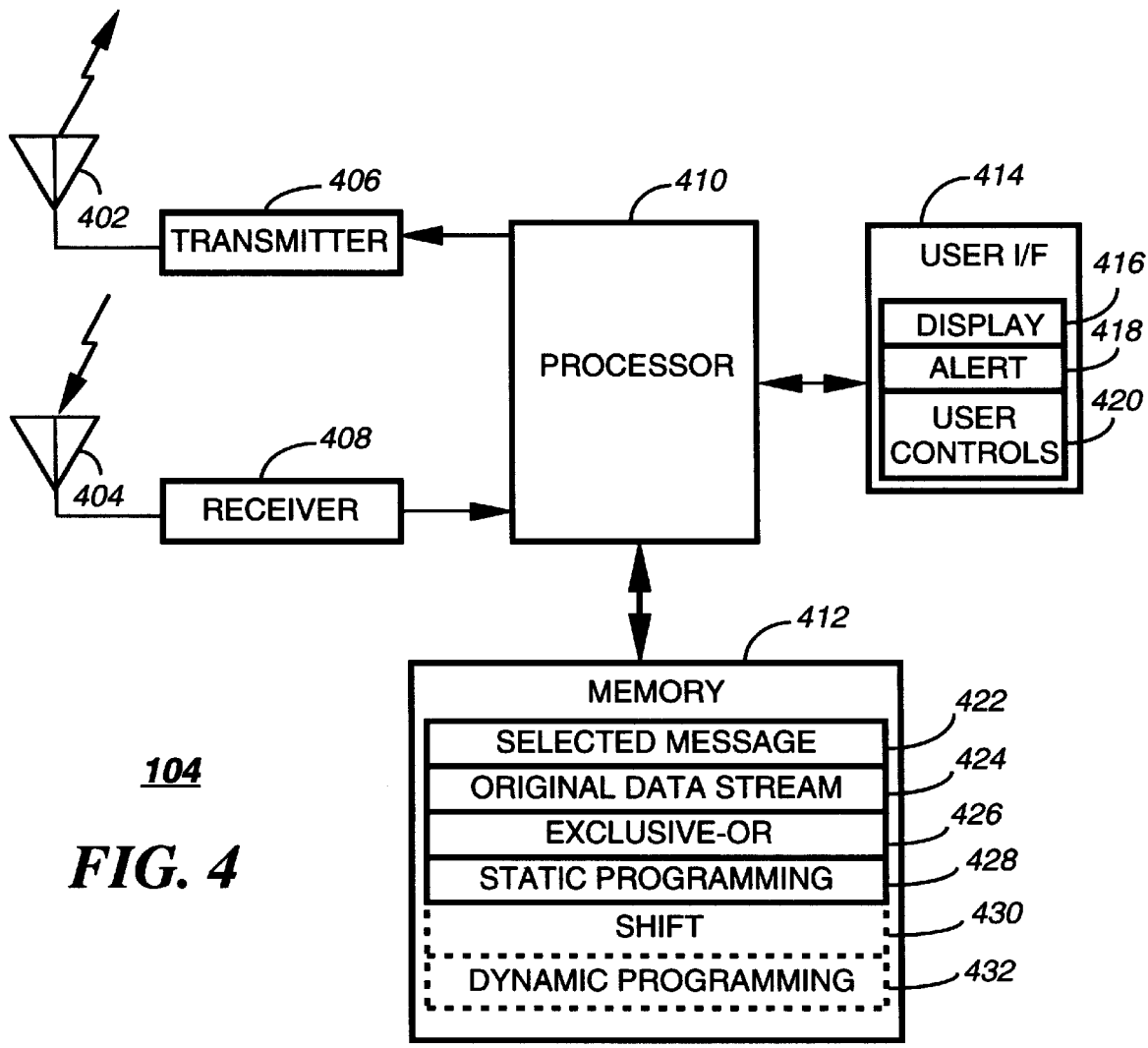
FIG. 4 is an electrical block diagram of a communicator in accordance with the present invention.

Referring to FIG. 4, an electrical block diagram depicts the communicator 104 in accordance with the present invention, comprising an antenna 404 for intercepting transmissions from the base stations 102. The antenna 404 is coupled to a conventional receiver 408 for receiving the transmissions to derive information therefrom. The receiver 408 is coupled to a processor 410 for processing the received information, including static and dynamic programming information, as is discussed further herein below. The processor 410 is coupled to a user interface 414 for conveying portions of the received information to a user, via, for example, a conventional display 416. The user interface 414 also includes a conventional alert 418 for alerting the user that new information has arrived. In addition, the user interface includes conventional user controls 420 for controlling the communicator 104. The processor is further coupled to a transmitter 406 for communicating a transmission data stream to the receiver 508 (FIG. 5) of the base station 102. The transmitter 406 is coupled to an antenna 402 for emitting a radio signal comprising the transmission data stream. It will be appreciated that, alternatively, the two antennas 402, 404 can be replaced with a single antenna used for both transmitting and receiving. In this case, a switch or other means can be used to isolate the receiver 408 and the transmitter 406.

The processor 410 is further coupled to a conventional memory 412 for storing software and variables for programming the processor 410 in accordance with the present invention. The memory comprises a selected message 422, preferably programmed in response to programming information received from the base station 102 as described further below. The selected message 422 preferably is a shorthand representation of a regional identifier representing a destination within the communication system 100. Examples of regional identifiers include zone IDs, sub-zone IDs, service provider IDs, and/or a desired destination. Alternatively, the selected message 422 can represent other elements as well, such as a pager type, and a pager class, to name a few possible elements.

The memory further comprises an original data stream 424, i.e., a data stream 300 as originally created by the communicator 104 for sending to the base station 102. The memory 412 preferably further comprises an exclusive-OR element 426 for programming the processor 410 to perform an exclusive-OR logic operation between the selected message 422 and a predetermined portion of the original data stream 424. Alternatively, the memory 412 can include a shift element 430 for programming the processor 410 to perform a rotational shift on a predetermined portion of the original data stream 424, the rotational shift determined by the selected message 422. In either case, the first objective is to alter the original data stream 424 in a manner corresponding uniquely with the selected message 422 to form a transmission data stream having a size identical to that of the original data stream 424. A second objective is to alter the original data stream 424 in a manner that is reversible, so that the original data stream 424 can be recovered after the transmission data stream is received. It will be appreciated that one of ordinary skill in the art will be able to devise many other ways in which the original data stream 424 can be altered which meet the first and second objectives.

The memory 412 also preferably includes a static programming element 428 for statically programming the communicator 104 with the selected message 422 in response to receiving the selected message 422 from the base station 102. Alternatively, the memory 412 can include a dynamic programming element 432 for dynamically programming the communicator 104 with the selected message 422 in response to receiving the selected message 422 from the base station 102. Preferably, the hardware of the communicator 104 is similar to that of the Tango™ messaging unit manufactured by Motorola, Inc. of Schaumburg, Ill. It will be appreciated that, alternatively, other similar hardware can be utilized as well for the communicator 104.

Figure 5:
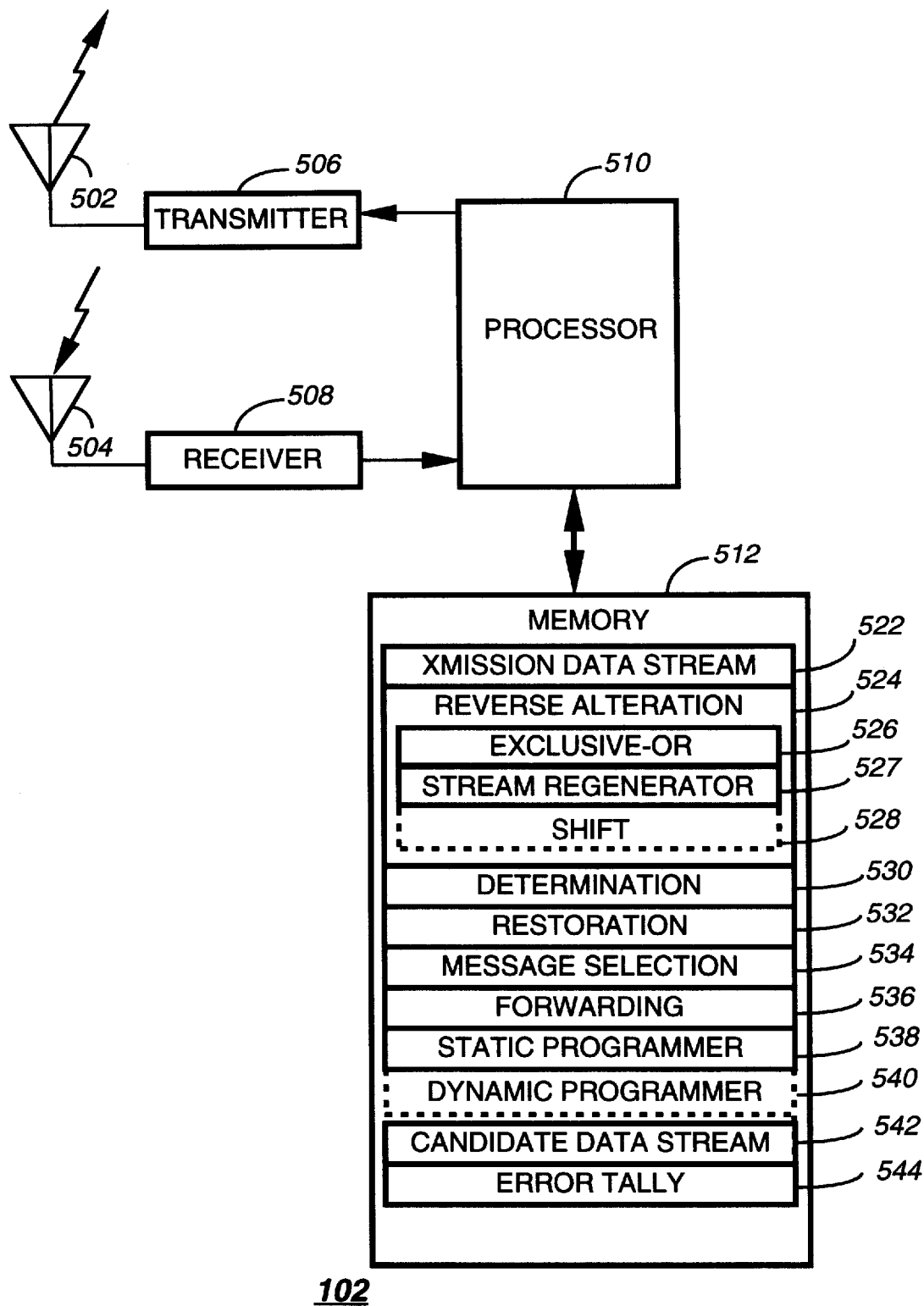
FIG. 5 is an electrical block diagram of a base station in accordance with the present invention.

Referring to FIG. 5, an electrical block diagram depicts the base station 102 in accordance with the present invention, comprising an antenna 504 for intercepting a transmission data stream 522 comprising additional information sent from the communicator 104. The antenna 504 is coupled to a receiver 508 for receiving the transmission data stream 522. The receiver 508 is coupled to a processor 510 for processing the transmission data stream 522. A memory 512 is coupled to the processor 510 for storing the transmission data stream 522 and for programming the processor 510 in accordance with the present invention. The processor 510 is coupled to a transmitter 506 for transmitting outbound information to the communicator 104, the outbound information including static and dynamic programming information. The transmitter 506 is coupled to an antenna 502 for emitting the outbound information as a radio signal. It will be appreciated that, alternatively, the two antennas 502, 504 can be replaced with a single antenna used for both transmitting and receiving. In this case, a switch or other means can be used to isolate the receiver 508 and the transmitter 506. It will be further appreciated that the receiver 508, and additional receivers 508, can be positioned at locations remote from the base station 102.

In addition to storing the transmission data stream 522, the memory 512 includes a reverse alteration element 524 for reversing an alteration performed by the communicator 104 to the original data stream 424 as it applies to at least one of at least two predetermined messages, thereby generating at least one candidate data stream 542. The reverse alteration element 524 preferably comprises an exclusive-OR element 526 for performing an exclusive-OR logic operation between the at least one of the at least two predetermined messages and a predetermined portion, e.g., a corresponding number of bits of the address field 306, of the transmission data stream 522. The reverse alteration element 524 further comprises a data stream regenerator 527 for generating a candidate data stream 542 identical to the original data stream, in response to one of the at least two predetermined messages producing the lowest error tally 544, the one of the at least two predetermined messages being implicitly assigned to a communicator 104 that forms the transmission data stream 522 to be identical to the original data stream 424. Alternatively, the reverse alteration element 524 can comprise a shift element 528 for performing at least one rotational shift on a predetermined portion, e.g., a corresponding number of bits of the address field 306, of the transmission data stream 522, the at least one rotational shift determined by the at least one of the at least two predetermined messages.

The memory 512 further comprises a determination element 530 for programming the processor 510 to determine from the error checking mechanism 310, 312 the error tally 544 corresponding to the at least one candidate data stream 542. The memory 512 also includes a restoration element 532 for programming the processor 510 to select from the at least one candidate data stream 542 a member corresponding to a lowest error tally 544, the member thereafter defined to be a restored original data stream. In addition, the memory 512 includes a message selection element 534 for programming the processor 510 to select one of the at least two predetermined messages as the selected message, the selected message associated with the lowest error tally 544. The memory 512 further comprises a forwarding element 536 for programming the processor 510 to forward the restored original data stream to a destination corresponding to the selected message. The memory 512 preferably also includes a static programmer 538 for statically programming the communicator 104 with the selected message. Alternatively, the memory 512 can include a dynamic programmer 540 for dynamically programming the communicator 104 with the selected message.

Figure 6:
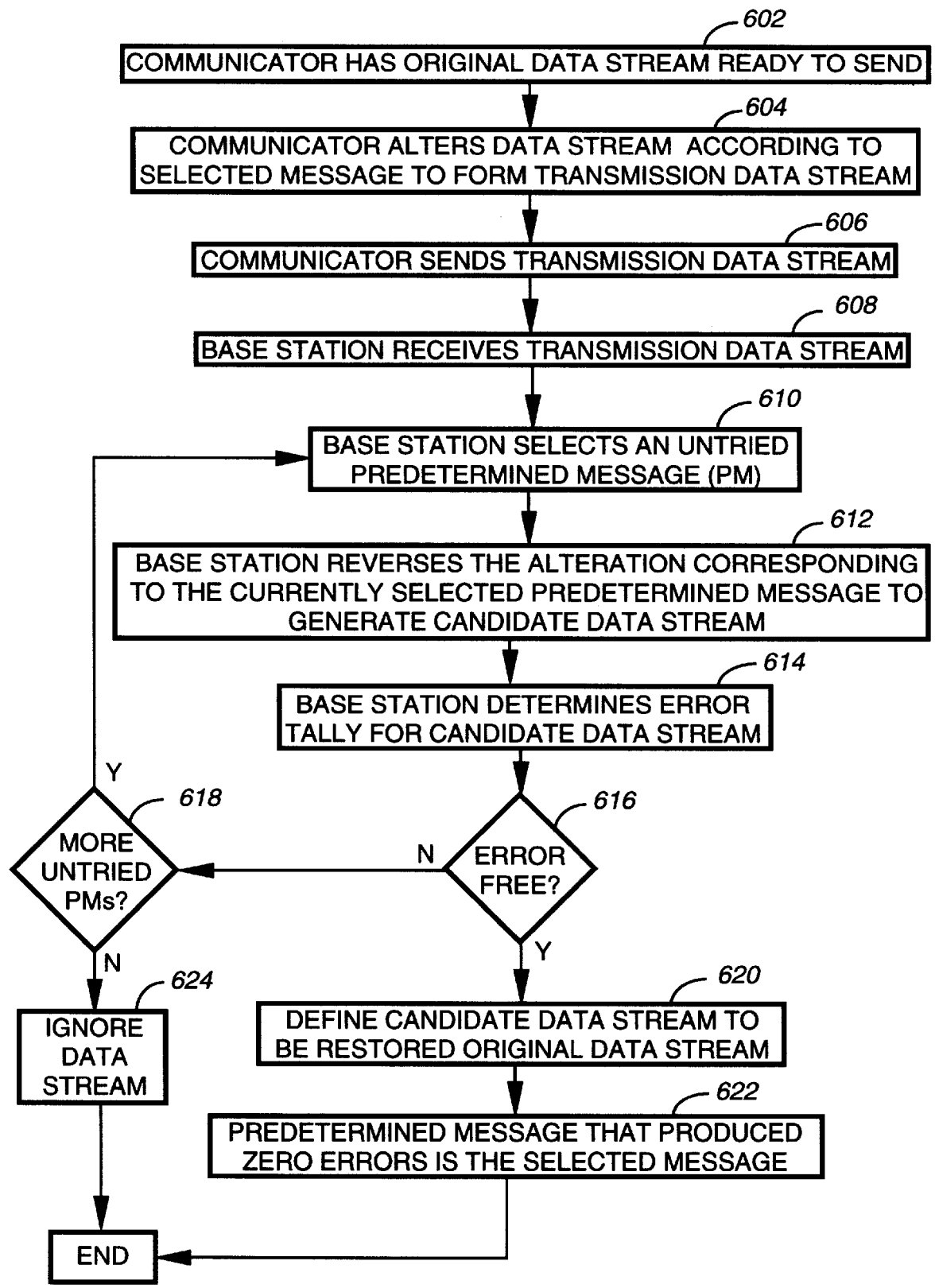
FIG. 6 is a flow diagram depicting alteration and restoration of an original data stream in accordance with the present invention.

Referring to FIG. 6, a flow diagram 600 depicts alteration and restoration of an original data stream 424 in accordance with the present invention. The flow begins at step 602, where the communicator 104 has an original data stream 424 ready to send. The processor 410 of the communicator 104 then preferably accesses the exclusive-OR element 426 to alter 604 the original data stream 424 in accordance with the selected message 422 by performing an exclusive-OR between the selected message 422 and a portion, e.g., a corresponding number of the least significant bits of the address field 306, of the original data stream 424. The selected message 422 preferably is programmed into the memory 412 as described further herein below, and can be, for example, a bit pattern representing a regional identifier for identifying a destination for which the original data stream is intended. It will be appreciated that, alternatively, the processor 410 can access the shift element 430 and can rotationally shift the bits of a portion of the original data stream by a number of bit positions corresponding to the selected message 422. One of ordinary skill in the art will recognize that there are many alternative ways in which the original data stream 424 can be altered to form the transmission data stream 522 in a manner that allows a subsequent reversal of the alteration in order to restore the original data stream 424.

After forming the transmission data stream 522, the communicator 104 transmits 606 the transmission data stream 522. The base station 102 then receives 608 the transmission data stream 608. The base station then selects 610 an untried predetermined message from at least two predetermined messages representing a set of possible messages that the base station 102 could reasonably be expected to receive. For example, the base station 102 can reasonably expect to receive messages associated with its own region and with nearby regions that may be within radio reception range. The base station 102 then uses the untried predetermined message as a "key" to try to reverse 612 the alteration performed by the communicator 104 on the original data stream 424, thereby generating a candidate data stream. The base station 102 then accesses the determination element 530 to determine 614 the error tally 544 corresponding to the candidate data stream, utilizing well-known error checking techniques. In step 616 the processor 510 of the base station 102 checks whether the error tally 544 is zero. If so, then the candidate data stream is deemed to correspond to the original data stream 424, and the processor 510 defines 620 the candidate data stream to be the restored original data stream. In addition, the processor 510 determines 622 that the currently selected predetermined message which produced the zero error tally 544 is the selected message which was utilized by the communicator 104 to alter the original data stream 424 to produce the transmission data stream 522.

If, on the other hand, in step 616 the processor 510 determines the error tally 544 not to be error free, then the processor 510 checks 618 whether there are more untried predetermined messages. If so, the flow returns to step 610 to select another untried predetermined message. If not, the processor 510 has not been able to derive an error-free candidate data stream after trying all possible predetermined messages, so the processor 510 ignores 624 the received data stream. It will be appreciated that, alternatively, when the error tally 544 indicates a variable number of errors for each of the predetermined messages tried, the predetermined message corresponding to the lowest error tally 544 can be determined to be the selected message which was utilized by the communicator 104 to alter the original data stream 424 to produce the transmission data stream 522. This would allow, for example, a retransmission request message to be returned to the communicator 104 from the base station 102 corresponding to the region represented by the selected message in response to uncorrected errors being present in all candidate data streams.

It is worth noting that some base stations 102 can also receive data streams on more than one channel. Such a base station 102 may occasionally receive a ghost transmission from within its own region. For this reason, a multi-channel base station 102 preferably will look for identical transmissions that are simultaneously received on multiple channels. When such transmissions are detected, only the strongest of the identical transmissions is retained, while the weaker transmissions are discarded.

Figure 7:
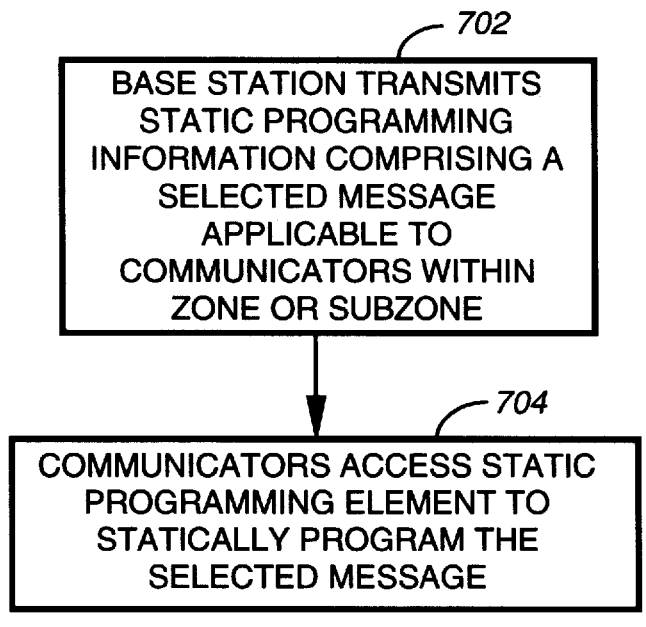
FIG. 7 is a flow diagram depicting static programming of the communicator in accordance with the present invention.

Referring to FIG. 7, a flow diagram 700 depicts static programming of the communicator 104 in accordance with the present invention. The flow diagram 700 begins with the base station 102 transmitting 702 static programming information comprising the selected message 422 applicable to communicators within the zone or subzone covered by the base station 102. Preferably, the selected message 422 is transmitted in a new block information word 204 in accordance with the present invention. The communicators 104 then access 704 their respective static programming elements 428 to statically program the selected message 422.

Figure 8:
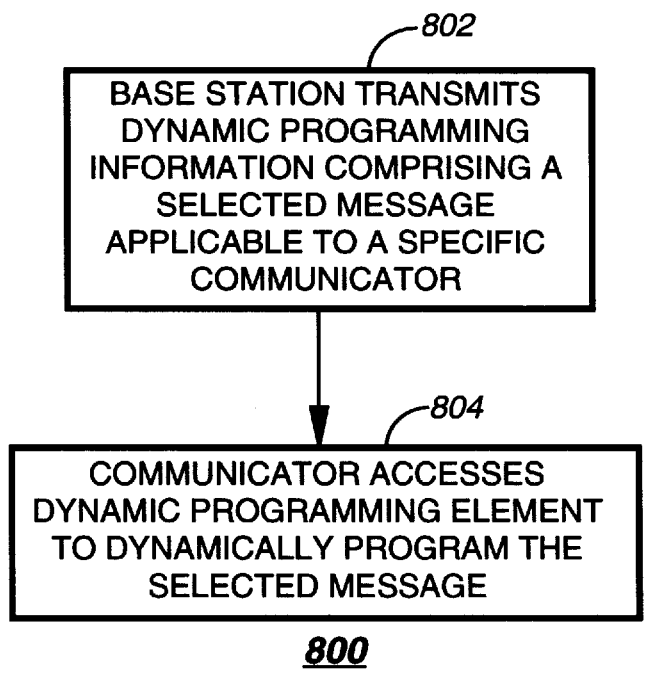
FIG. 8 is a flow diagram depicting dynamic programming of the communicator in accordance with the present invention.

Referring to FIG. 8, a flow diagram 800 depicts dynamic programming of the communicator 104 in accordance with the present invention. The flow diagram 800 begins with the base station 102 transmitting 802 dynamic programming information comprising a selected message 422 applicable to a specific communicator 104. The dynamic programming information can require dynamic updating, for example, because the communicator 104 has recently relocated to a position near a single receiver 508. Because the dynamic programming information applies specifically to one communicator 104, the information is preferably transmitted as a vector 208 associated with a specific selective call address 206. Alternatively, the information can be transmitted as a message 210 associated with an address 206. The communicator 104 then accesses 804 the dynamic programming element 432 to dynamically program the selected message 422.

Thus it should be apparent by now that the present invention provides a method and apparatus that can distinguish a signal intended for a region from a signal intended for another region. The method and apparatus advantageously does not require an additional field to be added to the data stream. More broadly, the present invention provides a method and apparatus in a data communication system for communicating selected additional data without increasing the size of the data stream.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method in a communication system utilizing an original data stream for communicating information by using a communication protocol having an error checking mechanism, the method for communicating additional data selected from at least two predetermined messages to define a selected message, wherein the at least two predetermined messages represent regional identifiers, the method comprising the steps of:

altering the original data stream in a manner corresponding uniquely with the selected message to form a transmission data stream having a size identical to that of the original data stream;

communicating the transmission data stream;

selecting a trial message from the at least two predetermined messages;

reversing the altering step as if the altering step had been performed in accordance with the trial message, thereby generating a candidate data stream;

determining from the error checking mechanism an error tally corresponding to the candidate data stream;

continuing the selecting, reversing, and determining steps until finding a lowest error tally; and estimating the selected message to be the trial message corresponding to the lowest error tally.

2. The method of claim 1, wherein the altering step comprises the step of performing an exclusive-OR logic operation between the selected message and a predetermined portion of the original data stream.

3. The method of claim 1, wherein the reversing step comprises the step of performing an exclusive-OR logic operation between the at least one of the at least two predetermined messages and a predetermined portion of the transmission data stream.

4. The method of claim 1, wherein the altering step comprises the step of performing a rotational shift by a number of bit positions on a predetermined portion of the original data stream, the number of bit positions determined by the selected message.

5. The method of claim 1, wherein the reversing step comprises the step of performing at least one rotational shift by a number of bit positions on a predetermined portion of the transmission data stream, the number of bit positions determined by the trial message.

6. The method of claim 1,
wherein the at least two predetermined messages are for indicating destinations for which the original data stream is intended, and
wherein the method further comprises the step of forwarding the restored original data stream to a destination corresponding to the selected message.

7. The method of claim 1,
wherein the communication system includes a communicator that forms the transmission data stream to be identical to the original data stream, and
wherein one of the at least two predetermined messages is implicitly assigned to the communicator, and
wherein the reversing step as it applies to the one of the at least two predetermined messages comprises the step of
generating a candidate data stream identical to the original data stream and producing the lowest error tally.

8. The method of claim 1, wherein the communication system includes means for dynamically programming a communicator with the selected message, and wherein the method further comprises the step of
dynamically programming the communicator with the selected message.

9. The method of claim 1, wherein the communication system includes means for statically programming a communicator with the selected message, and wherein the method further comprises the step of
statically programming the communicator with the selected message.

10. A communicator in a communication system utilizing an original data stream for communicating information by using a communication protocol having an error checking mechanism, the communicator for communicating additional data selected from at least two predetermined messages to define a selected message, wherein the at least two predetermined messages represent regional identifiers, the communicator comprising:
a memory for storing the selected message and further for storing the original data stream;
a processor coupled to the memory, the processor programmed to alter the original data stream in a manner corresponding uniquely with the selected message to form a transmission data stream having a size identical to that of the original data stream;
a transmitter coupled to the processor for communicating the transmission data stream to a receiver; and
a user interface for conveying the information to a user.

11. The communicator of claim 10, wherein the memory comprises
an exclusive-OR program for programming the processor to perform an exclusive-OR logic operation between the selected message and a predetermined portion of the original data stream.

12. The communicator of claim 10, wherein the memory comprises
a shift program for programming the processor to perform a rotational shift by a number of bit positions on a predetermined portion of the original data stream, the number of bit positions determined by the selected message.

13. The communicator of claim 10, wherein the communication system includes means for dynamically programming the communicator with the selected message, and wherein the communicator further comprises:
a receiver coupled to the processor for receiving dynamic programming information from a transmitter of the communication system; and
a dynamic programming element coupled to the processor for dynamically programming the communicator with the selected message.

14. The communicator of claim 10, wherein the communication system includes means for statically programming the communicator with the selected message, and wherein the communicator further comprises:
a receiver coupled to the processor for receiving static programming information from a transmitter of the communication system; and
a static programming element coupled to the processor for statically programming the communicator with the selected message.

15. A base station in a communication system utilizing an original data stream for communicating information by using a communication protocol having an error checking mechanism, the base station for receiving additional data selected from at least two predetermined messages to define a selected message, wherein the at least two predetermined messages represent regional identifiers, the base station comprising:
a receiver for receiving a transmission data stream comprising the additional data from a communicator of the communication system, the transmission data stream formed by the communicator by altering the original data stream in a manner corresponding uniquely with the selected message;
a memory coupled to the receiver for storing the transmission data stream;
a processor coupled to the receiver for processing the transmission data stream, wherein the processor is programmed to:
select a trial message from the at least two predetermined messages;
reverse the altering of the original data stream as if the altering had been performed in accordance with the trial message, thereby generating a candidate data stream;
determine from the error checking mechanism an error tally corresponding to the candidate data stream;
continue to select a trial message, reverse the altering, and determine a corresponding error tally until finding a lowest error tally; and
estimate the selected message to be the trial message corresponding to the lowest error tally.

16. The base station of claim 15, wherein the processor is further programmed to
perform an exclusive-OR logic operation between the trial message and a predetermined portion of the transmission data stream.

17. The base station of claim 15, wherein the processor is further programmed to
perform at least one rotational shift by a number of bit positions on a predetermined portion of the transmission data stream, the number of bit positions determined by the trial message.

18. The base station of claim 15,
wherein the at least two predetermined messages are for indicating destinations for which the original data stream is intended, and wherein the base station further comprises
- a forwarding program coupled to the processor for programming the processor to forward the restored original data stream to a destination corresponding to the selected message.

19. The base station of claim 15, wherein the communicator forms the transmission data stream to be identical to the original data stream, and wherein one of the at least two predetermined messages is implicitly assigned to the communicator, and wherein the processor is further programmed to generate a candidate data stream identical to the original data stream, in response to the one of the at least two predetermined messages producing the lowest error tally.

20. The base station of claim 15, further comprising
- a transmitter coupled to the processor for transmitting outbound information to the communicator; and
- a dynamic programmer coupled to the processor for dynamically programming the communicator with the selected message.

21. The base station of claim 15, further comprising
- a transmitter coupled to the processor for transmitting outbound information to the communicator; and a static programmer coupled to the processor for statically programming the communicator with the selected message.

* * * * *